United States Patent
Hofni et al.

(10) Patent No.: US 10,922,960 B2
(45) Date of Patent: Feb. 16, 2021

(54) RADIO COMMUNICATION DEVICE WITH HIGH PRECISION REAL TIME CLOCK

(71) Applicant: Kamstrup A/S, Skanderborg (DK)

(72) Inventors: Jeppe Hofni, Skanderborg (DK); Jens Pedersen, Skanderborg (DK); Tommy Bechsgaard, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 0 days.

(21) Appl. No.: 16/803,292

(22) Filed: Feb. 27, 2020

(65) Prior Publication Data
US 2020/0279476 A1    Sep. 3, 2020

(30) Foreign Application Priority Data
Feb. 28, 2019 (EP) .................................... 19159873

(51) Int. Cl.
*G08C 17/02* (2006.01)
*G06F 13/42* (2006.01)
(Continued)

(52) U.S. Cl.
CPC ............... *G08C 17/02* (2013.01); *G01D 4/00* (2013.01); *G01D 4/002* (2013.01); *G01D 4/006* (2013.01); *G06F 13/4291* (2013.01); *H04Q 9/04* (2013.01)

(58) Field of Classification Search
CPC ...... G08C 17/02; G06F 13/4291; G01D 4/00; G01D 4/002; G01D 4/006
See application file for complete search history.

(56) References Cited

U.S. PATENT DOCUMENTS 6,307,896 B1 * 10/2001 Gumm ..................... H04B 1/30
  375/316
6,618,456 B1 *  9/2003 Lansdowne ........... H04L 7/0331
  375/354
(Continued)

FOREIGN PATENT DOCUMENTS

CN     103024778 A    4/2013

OTHER PUBLICATIONS

European Search Report for corresponding EP Patent Application No. EP 19159873 dated Aug. 9, 2019.

*Primary Examiner* — Dominic E Rego
(74) *Attorney, Agent, or Firm* — Renner, Otto, Boisselle & Sklar, LLP

(57) ABSTRACT

A radio communication device comprising a radio frequency circuit and a microcontroller arranged to control the radio frequency circuit. The radio communication device further comprises: a radio frequency reference connected to the radio frequency circuit and arranged to be the frequency reference of at least the symbol frequency; a MCU and a time frequency reference connected to the microcontroller. The microcontroller is arranged to determine a frequency error of the time frequency reference relative to the radio frequency reference by performing the steps of: transmitting a radio signal, and signal a timing signal on a control interface, comprising information on start of transmission and end of transmission of the radio signal; receive the timing signal from the radio frequency circuit and measure a transmission duration of the radio signal with reference to the MCU frequency reference and calculate a frequency error of the MCU frequency reference relative to the radio frequency reference based on the measured transmission duration of the radio signal and the number of symbols and the symbol frequency. Further, the microcontroller measures a time period of the time frequency reference with reference (Continued)

to the MCU frequency reference; and calculate the frequency error of the time frequency reference relative to the radio frequency reference.

15 Claims, 1 Drawing Sheet

(51) Int. Cl.
   *G01D 4/00*    (2006.01)
   *H04Q 9/04*    (2006.01)

(56) References Cited

U.S. PATENT DOCUMENTS

| | | | |
|---|---|---|---|
| 6,636,488 B1 * | 10/2003 | Varma | H04L 1/0006 |
| | | | 370/278 |
| 7,085,276 B1 | 8/2006 | Heitmann | |
| 7,209,849 B1 * | 4/2007 | Watanabe | G01R 31/31919 |
| | | | 324/755.01 |
| 9,400,192 B1 | 7/2016 | Salser, Jr. | |
| 10,057,021 B2 * | 8/2018 | Tsai | H04L 5/0007 |
| 2004/0152438 A1 * | 8/2004 | Yamauchi | H04W 56/0035 |
| | | | 455/343.1 |
| 2010/0010775 A1 * | 1/2010 | Ohkubo | G06F 1/14 |
| | | | 702/178 |
| 2010/0131347 A1 * | 5/2010 | Sartipi | G06Q 20/32 |
| | | | 705/14.33 |
| 2011/0039510 A1 * | 2/2011 | Tamate | H04B 1/109 |
| | | | 455/296 |
| 2011/0300811 A1 * | 12/2011 | Minemura | H04W 56/0035 |
| | | | 455/75 |
| 2015/0071220 A1 * | 3/2015 | Luo | H04L 5/001 |
| | | | 370/329 |
| 2015/0078269 A1 * | 3/2015 | Cosimini | H04L 5/0064 |
| | | | 370/329 |
| 2015/0078469 A1 * | 3/2015 | McFarland | H04L 5/0064 |
| | | | 375/260 |
| 2019/0045498 A1 * | 2/2019 | Huang | H04W 72/0453 |
| 2019/0171965 A1 * | 6/2019 | Ferguson, Jr. | H04B 1/38 |
| 2019/0265749 A1 * | 8/2019 | Asada | H05K 13/0882 |
| 2020/0068569 A1 * | 2/2020 | Fu | H04W 72/0446 |
| 2020/0119722 A1 * | 4/2020 | Kamiyama | H03K 3/0231 |
| 2020/0149940 A1 * | 5/2020 | Shen | G01N 29/024 |
| 2020/0229103 A1 * | 7/2020 | Hosseini | H04W 76/15 |
| 2020/0271686 A1 * | 8/2020 | Plancke | B60C 23/0416 |

* cited by examiner

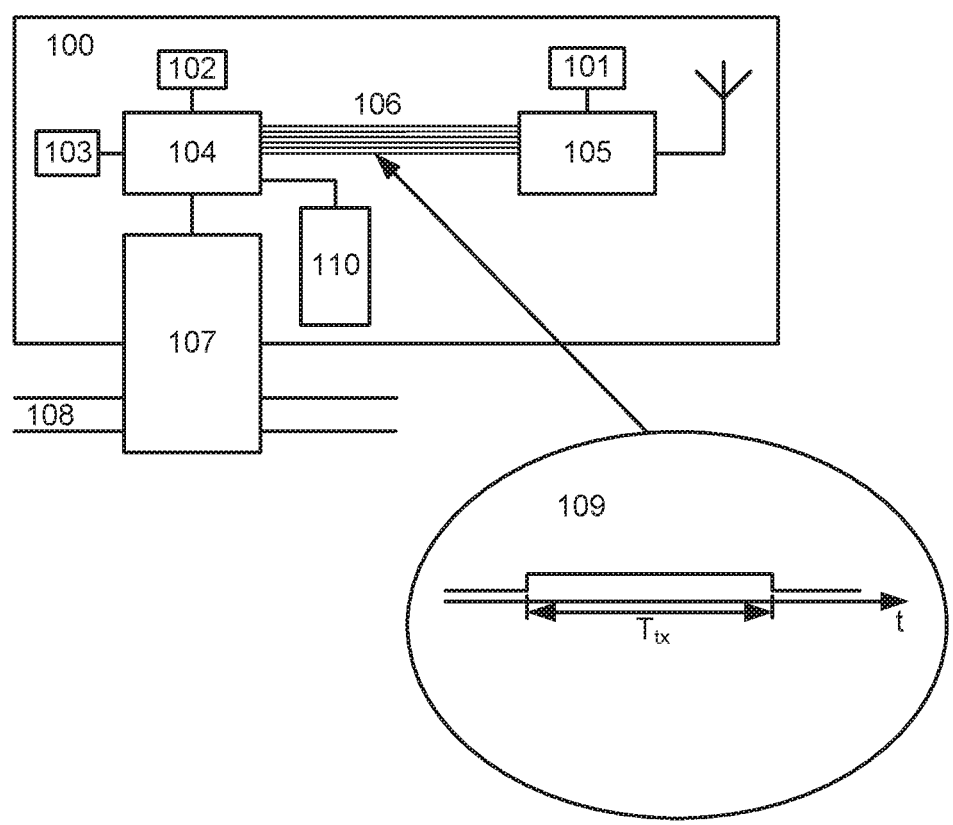

RADIO COMMUNICATION DEVICE WITH HIGH PRECISION REAL TIME CLOCK

This application claims priority to EP Patent Application No. 19159873.9 filed Feb. 28, 2019, which is hereby incorporated herein by reference.

FIELD OF THE INVENTION

The present invention relates to the field of battery-operated radio communication devices comprising multiple frequency references serving as references for time measurement units, Real Time Clocks (RTC) and communication modules. Especially radio communication devices suitable for IOT and utility metering applications.

BACKGROUND OF THE INVENTION

Radio communication devices suitable for internet of things (IOT) applications, such as utility meter reading and smart meter management, are required to establish extremely robust long-range wireless connections between the IOT device and an access point arranged for communicating with the IOT device. Such radio communication devices often include high precision frequency references. Such high precision frequency references are used by the radio communication devices to provide a frequency stable radio transmission e.g. in narrow band communication solutions. The high precision references are however often not directly suitable for time measurements due to a high energy consumption and a high nominal operating frequency. However, it is desired to propagate the high precision of such a reference to other low precision frequency references which are suitable for time measurements.

Utility meters are advanced sensors that measure consumption of utilities such as water, gas, district heating or cooling and electricity. Further the utility meters monitor the quality of the supplied utility and consumption patterns to register events and parameters such as: leak or burst in water meters or district heating meters; over or under voltage in an electricity meter; where applicable drop of pressure or temperature of the supplied utility. Also, external events such as ambient temperature and acoustic events may be registered by sensors. To increase the quality and usability of the measured consumption data, events and parameters, accurate time stamping of the measurements is required. A high precision and reliable time reference is thus desirable in the utility meter where it may be an essential element in a Real Time Clock (RTC) of the utility meter.

Modern utility meters comprise radio communication devices for communicating with IOT infrastructures, Automatic meter reading (AMR) systems and advanced meter infrastructure (AMI) systems, in the following commonly referred to as meter reading system. Such systems are generally known in the art. Utility companies uses such meter reading systems to read and monitor utility meters remotely, typically using radio frequency (RF) communication. AMR and AMI systems increase the efficiency and accuracy of collecting readings and managing customer billing.

Utility meters are often battery-powered, and consequently have a finite amount of energy available for their service cycle. Because of a service cycle for utility meters of typically 10-20 years, it is desirable to reduce cost associated with meter exchange or battery replacement, thus, energy conservation is a major design criterion. In addition, utility meters having electrical mains available as an energy source, energy conservation is also desirable.

The internal time reference of a battery-powered utility meter is typically a simple low power quartz crystal resonator. The problem with this kind of crystal is among others that they are very susceptible to temperature fluctuations causing a varying frequency error and to aging which cause a frequency offset. A utility meter using such a time reference for a Real Time Clock will over a deployment period of 10-20 years typically experience a drift of the RTC of several hours, causing a significant and undesired error on timestamping of measured consumption data, events and parameters. This problem is especially relevant for utility meters which only provide one-way communication, whereas utility meters supporting two-way communication may have the RTC set through the meter reading system whereby the drift is mitigated. Further, it is often a wanted feature that the utility meter transmits more frequently during the night time when interference in the communication channels is typically at the lowest level. A day-night cycle indicator functionality for that purpose cannot be implemented if the real time clock is prone to a drift of several hours.

AMI systems comprise a high number of utility meters and sensors all containing a communication module communicating in one or more communication channels. To optimize utilization of the communication channels medium access techniques such as Time Divisional Multiple Access (TDMA) is often used. Efficient use of TDMA require a timing precision which is higher than what may be obtained with a low power quartz crystal resonator (XO). Time offsets can to some extent be compensated for by frequently adjusting the AMI meters via the two-way communication interface, but for a battery-operated utility meter frequently adjustment will increase energy consumption to an unacceptable level.

High precision temperature compensated timing references such as Temperature Compensated Chrystal Oscillators (TCXO) or Oven Controlled Chrystal Oscillators (OCXO), which may also be preaged, are commonly used when a stable time reference is needed. Those solutions however have the drawback of a high energy consumption and increased component cost. The high energy consumption makes them unsuitable for continuous operation in cost optimized battery-operated utility meters.

External time reference received from the Global Positioning System (GPS) or RF time signals such as DCF77 may also be used as accurate time references. However, for utility meters, which are often installed underground in meter pits or in deep indoor locations such as basements, reception of these signals is highly unreliable. Further, dedicated receivers for these technologies will add cost to the utility meter.

Hence, a method to compensate for drift caused by quartz crystals errors caused by temperature fluctuations and aging would be advantageous. In particular a method which will only marginally increase the total energy consumption of the communication device such as a utility meter would be preferable.

OBJECT OF THE INVENTION

It is a further object of the present invention to provide an alternative to the prior art.

In particular, it may be seen as an object of the present invention to provide a communication device such as a utility meter that solves the above-mentioned problems by providing a reliable time reference with increased precision and resilience to temperature fluctuations and/or aging, without increasing energy consumption or component costs significantly.

SUMMARY OF THE INVENTION

Thus, the above described object and several other objects are intended to be obtained in a first aspect of the invention by providing a radio communication device comprising: a microcontroller connected to a radio frequency circuit by one or more control interfaces and arranged to control the radio frequency circuit to transmit a radio signal with a number of symbols and a symbol frequency; a time frequency reference of lower precision arranged to be a reference to the microcontroller for time measurements, such as timing reference for a real time clock; a radio frequency reference of higher precision connected to the radio frequency circuit and arranged to be frequency reference for generation of at least the symbol frequency of the radio signal; where the microcontroller is arranged to determine and compensate for a frequency error of the lower precision time frequency reference relative to the radio frequency reference based on: a timing signal generated by the radio frequency circuit and associated to a transmission duration of the radio signal, the number of symbols, and the symbol frequency controlled by the higher precision radio frequency reference.

The radio communication device is especially advantageous in that the precision of the radio frequency reference is propagated to the time frequency reference with a very limited loss of accuracy.

Further the claimed radio communication device is advantageous in that propagation of the precision of the radio frequency reference is achieved with a very limited increase in energy consumption which especially is relevant for battery operated meters. The very low increase in energy consumption is achieved in that measurements and determination of frequency errors of the MCU and time frequency reference is performed in time periods when the radio frequency reference has to be active due to generation of radio signals, whereby the duty cycle of the radio frequency reference does not increase.

A time frequency reference of a lower precision and a radio frequency reference of a higher precision is to be understood as the two frequency references relative to each other having a higher respectively lower precision. The terms higher and lower precision are not to be construed as absolute terms. Thus, the time frequency reference has a precision being lower than the precision of the radio frequency reference. The higher and lower precisions are to be evaluated considering initial precision, aging effects and temperature errors of the frequency references.

The microcontroller being arranged to determine and compensate for a frequency error of the lower precision time frequency reference is to be interpreted as determining the error and compensating for the error in a wide sense. Compensating may be construed as any one or more of the following alternatives or other alternative ways of compensating: Correcting a time measurement according to the determined error. Associating a time measurement with the determined error. Correcting time periods and delays observed by the microcontroller or other devices according to the determined error. Correcting the operating frequency of a frequency reference according to the frequency error. Adjusting the content of microcontroller registers to compensate for the frequency error. Adjusting the content of real time clock registers to compensate for the frequency error. Adjusting or correcting any HW or SW register with a content related to the frequency reference.

A timing signal generated by the radio frequency circuit and associated to a transmission duration of the radio signal is to be construed as a timing signal generated by the radio frequency circuit and being descriptive a transmission duration of the radio signal. Or with other words the timing signal is generated by the radio circuit and comprises timing information on the start of transmission and end of transmission.

The radio circuit is the entire radio circuit comprising analog circuits and digital parts such as processors, field programmable devices, signal processors, phase locked loops, mixers, power amplifiers and any other element used to transmit or receive radio signals. The radio circuit may be a single chip transceiver circuit.

The radio communication device as described above may, further comprise an MCU frequency reference connected to the microcontroller, and arranged to be a reference to the microcontroller for time measurements, wherein the microcontroller further is adapted to: measure on the timing signal the transmission duration of the radio signal with reference to the MCU frequency reference; calculate a frequency error of the MCU frequency reference relative to the radio frequency reference based on the measured transmission duration, the number of symbols and the symbol frequency; measure a time period of the time frequency reference with reference to the MCU frequency reference; and calculate the frequency error of the time frequency reference relative to the radio frequency reference based on the frequency error of the MCU frequency reference and the measured time period of the time frequency reference. The MCU frequency reference may have an operating frequency which is higher than the operating frequency of the time frequency reference. The resolution of time measurements with reference to a frequency reference is proportional to the operating frequency of the frequency reference. Measuring the transmission duration of the radio signal directly with reference to the time reference will result in a lower resolution of the measurement than a measurement with reference to the MCU frequency reference having an operating frequency being higher than the operating frequency of the time frequency reference. Thus, introducing the MCU frequency reference as an intermediate step of propagating the precision of the radio frequency reference to the time frequency reference has the technical effect of improving the measurement accuracies and thus reducing the loss of accuracy due to limited measurement resolutions.

The invention is in particular advantageous in the context of a radio communication device wherein the nominal absolute precision of the radio frequency reference is higher than the nominal absolute precision of the MCU and time frequency reference. By a higher nominal absolute precision of a reference is understood that the reference is more precise i.e. a clock sourced by the reference has a lower drift. If the absolute nominal precision is given in ppm (Parts Per Million) a reference having a precision of +/−10 ppm has a higher precision than a reference having a precision of +/−20 ppm. The absolute nominal precision depends normally on external factors such as temperature or supply voltage. Thus, as an example, a reference having an absolute nominal precision at 25° C. +/−15 ppm may have an absolute nominal precision of −200 to 230 ppm in the temperature range of −40 to 80° C. Furthermore, other phenomenon's such as aging of electronic components will affect the precision.

The radio communication device according to the above disclosure may have a microcontroller which further is adapted to: via the one or more control interfaces control the radio frequency circuit to: transmit a radio signal, and to generate a timing signal on at least one of the one or more control interfaces, the timing signal comprising information on start of transmission and end of transmission of the radio signal; receive the timing signal from the radio frequency circuit and measure a transmission duration of the radio signal with reference to the MCU frequency reference.

The microcontroller is arranged to control the radio frequency circuit using the control interfaces. This enables the microcontroller to control the transmission duration of a radio signal in that the microcontroller is able to determine/decide the number of symbols being transmitted and to select the symbol rate.

By a frequency reference is understood any component used as frequency reference in an oscillating circuit or an oscillating circuit as such or another device generating a frequency reference such as the frequency reference generated by a GPS receiver or a cellular communication device e.g. a 5G module. Components used as reference may be quartz crystals, ceramic oscillators, TCXO, OCXO, RC circuits or other resonant circuits. The reference components and devices may be based on any technology or physical effect such as the piezo electric effect, optical systems such as resonant light.

The microcontroller being arranged to determine a frequency error of the time frequency reference relative to the radio frequency reference is to be understood as: the microcontroller being arranged to determine a frequency error of the time frequency reference measured with reference to the radio frequency reference, where the frequency error of the time frequency reference is the difference between the nominal frequency and the operating frequency of the time frequency reference. Thus, the radio frequency reference is the absolute reference for determining the error of the time frequency reference. This has the effect that the precision and error of the radio frequency reference will be propagated to the time frequency reference. The frequency error may be an offset having the unit of Hertz or a fractional error in percent, permille or Parts Per Million (PPM) or any other value describing the magnitude of the error. The radio and time frequency references may have different nominal frequencies being separated with many orders of magnitude.

Calculating a frequency error of the MCU frequency reference relative to the radio frequency reference is to be understood in the same way as described above as: calculating a frequency error of the MCU frequency reference measured relative to the radio frequency reference, where the frequency error of the MCU frequency reference is the difference between the nominal frequency and the operating frequency of the MCU frequency reference.

It is understood that a frequency reference has a nominal frequency and an operating frequency. The nominal frequency is the expected or desired operating frequency as described in the component data sheet. The operating frequency is the actual frequency outputted from the frequency reference when active. The operating frequency is influenced by an offset error, aging effects, temperature, component tolerances etc. which all leads to a time varying difference between the nominal frequency and the operating frequency which is the error of the frequency reference.

The radio communication device shall be construed as any device including means for radio communication. Examples of such devices including means for radio communication may be utility meters, sensors for monitoring environmental parameters such as pollution, temperature, noise etc. process sensors for industrial applications and production plants, smart city sensors e.g. traffic sensors, parking sensors garbage bin sensors. Especially battery-operated devices may benefit from the invention. Especially battery-operated utility meters such as water meters, heat meters, cooling meters or gas meters often comprise radio communication devices and my benefit from the invention.

It is to be understood that elements of the radio communication device may be shared with a device in which it is embedded. As an example, if the communication device is embedded in a utility meter such as a water meter, the water meter and the communication device may share essential elements such as the microcontroller, battery and power supply, printed circuit board, user interfaces and other electronic circuits as well as SW implemented functionality in the microcontroller.

The nominal frequencies of the frequency references may be selected such that the radio frequency reference has an operating frequency which is higher than the operating frequency of the MCU frequency reference and the time frequency reference has an operating frequency which is lower than the operating frequency of the MCU frequency reference. This is especially advantageous in that the higher nominal frequency of the MCU frequency reference compared to the time frequency reference has the effect of minimizing the measurement error of the transmission duration.

A radio communication device wherein the radio frequency reference has a nominal frequency in a first range of 20-200 MHz, the MCU frequency reference has a nominal frequency in a second range of 2-20 MHz and the time frequency reference has a nominal frequency in a third range of 2-200 kHz has the following advantages. The nominal frequency of the radio frequency reference is suitable for generating radio signals in the sub 1 GHz license-free bands allocated around 860-880 MHz and 902-928 MHz as well as the 2.4 GHz band. The nominal frequency of the MCU frequency reference is advantageous in that it is suitable for clocking a low power microcontroller without causing excessive energy consumption and still sufficiently high to achieve a high resolution of time measurements on digital signals. The nominal frequency of the time frequency reference is advantageous in that a low power continuously active reference for long time measurements and RTCs is achieved. As such the selection of the three nominal frequencies has a synergistical effect of a low power high precision timing system for a radio communication device such as utility meter.

The radio communication device may comprise a Real Time Clock wherein the time frequency reference is the reference for the Real Time Clock. This is especially advantageous in that high precision time stamping of consumption data or sensor data is achieved.

In case high precision and high temperature tolerance is desired a radio communication device wherein the radio frequency reference is a Temperature Compensated Chrystal Oscillator is especially advantageous.

A radio communication device wherein the MCU frequency reference is the reference for a microcontroller clock and wherein the MCU frequency reference further is integrated in the microcontroller has the advantage of reducing the component cost of the radio communication device.

The radio communication device may be arranged such that the MCU frequency reference is a digitally controlled oscillator and the microcontroller is further arranged to perform a step of controlling the MCU frequency reference to compensate for the frequency error of the MCU frequency reference, whereby calculation of the frequency error of the time frequency reference relative to the radio frequency reference is based on the frequency error of the MCU frequency reference. This has the advantage that measurements made with reference to the MCU frequency reference does not need to be corrected. A further advantage is that peripherals of the microcontroller sourced by the MCU frequency reference will operate more precise e.g. a communication interface such as a UART (Universal Asynchronous Receiver/Transmitter).

For a radio communication device wherein the time frequency reference is a piezo electric element, propagation of the precision of the radio frequency reference is especially advantageous due to the high susceptibility to temperature variations of the piezo electric elements. Radio communication devices e.g. utility meters are often installed in environments with varying temperature such as close to or on heating installations in compartments on the outer surface of residence buildings.

The radio communication device may have one of the one or more control interfaces comprising an input/output port on the microcontroller and the radio frequency circuit, respectively. Such a port may be a GPIO (General Purpose Input Output) or it may be a port programmable to change output according to an internal state of the device such as end or start of transmission. Further, the port may be programmable to capture an internal timer or start/stop a timer when the signal input to the port is changed. A part of the control interface may be arranged according to a serial communication protocol such as I2C or SPI.

The radio communication device may further comprise a temperature sensor arranged to measure an internal temperature of the radio communication device and wherein the microcontroller further is arranged to measure the internal temperature when determining the error of the time frequency reference to create a temperature-frequency-error table describing the frequency error as a function of the temperature. This has the advantage that when the temperature-frequency-error table has been established it may be reused without updating for an extended time period due to the fact that most parameters influencing the frequency error, except for temperature, are evolving very slow e.g. aging effects. Further the table may be used for maintaining statistically derived frequency errors based on multiple measurements/determinations of the frequency error.

The temperature-frequency-error table is especially advantageous in an embodiment of the radio communication device where the microcontroller is arranged to measure the internal temperature of the radio communication device and to correct a Real Time Clock of the radio communication device according to the measured temperature and the temperature-error table.

In a second aspect of the invention the communication device is a utility meter for measuring the amount of a utility delivered to a consumption site, the utility meter comprising: a radio communication device according to any of the embodiments described above; a time measurement device such as a real time clock, wherein the time frequency reference is the reference to the time measurement device.

The utility meter according to this aspect has embedded means for communication and as such becomes a communication device. The utility meter uses time measurements for time stamping measurement date, controlling tariffs, opening and closing valves, controlling transmission timing, maintaining a Real Time Clock (RTC) etc. Using such. The precision of the time measurements directly influences the quality of the measurements. Propagating the precision of the high precision radio frequency reference to the time frequency reference according the first aspect of the invention has the effect of obtaining a utility meter with a high precision time stamping of consumption data, without increasing energy consumption or component cost of the utility meter.

The radio communication device may be described as a utility meter comprising: a radio frequency circuit; a microcontroller connected to the radio frequency circuit by one or more control interfaces and arranged to control the radio frequency circuit to transmit radio signals with a number of symbols and a symbol frequency; a radio frequency reference connected to the radio frequency circuit and arranged to be the frequency reference of at least the symbol frequency; a MCU frequency reference connected to the microcontroller; a time frequency reference connected to the microcontroller; where the microcontroller is arranged to determine a frequency error of the time frequency reference relative to the radio frequency reference by performing the following steps: via the one or more control interfaces control the radio frequency circuit to: transmit a radio signal, and to signal a timing signal on at least one of the one or more control interfaces, the timing signal comprising information on start of transmission and end of transmission of the radio signal; receive the timing signal from the radio frequency circuit and measure a transmission duration of the radio signal with reference to the MCU frequency reference; calculate a frequency error of the MCU frequency reference relative to the radio frequency reference based on the measured transmission duration of the radio signal, the number of symbols and the symbol frequency; measure a time period of the time frequency reference with reference to the MCU frequency reference; and calculate the frequency error of the time frequency reference relative to the radio frequency reference based on the frequency error of the MCU frequency reference and the measured time period of the time frequency reference.

BRIEF DESCRIPTION OF THE FIGURES

The radio communication device according to the invention will now be described in more detail with regard to the accompanying figures. The figures show one way of implementing the present invention and is not to be construed as being limiting to other possible embodiments falling within the scope of the attached claim set.

FIG. 1 is block diagram showing elements of a radio communication device embedded in a utility meter.

DETAILED DESCRIPTION OF AN EMBODIMENT

The battery powered utility meter 100 of FIG. 1 is a radio communication device comprising a microcontroller 104, a radio frequency circuit 105, a transducer circuit 107 and a battery 110. The utility meter further comprises three different frequency references 101, 102, 103 serving three different purposes and having three different sets of operating parameters and characteristics. The detailed description discloses an embodiment, in which the three frequency references are combined to achieve a synergistic effect enabling realization of a low cost, high precision Real Time Clock (RTC) with a low energy consumption.

The three different frequency references comprised in the utility meter, are each arranged in an oscillator circuit or is constituting an oscillator circuit. As such each of the frequency references are also suitable as timing reference, which may be used for time measurements. The frequency references are in the following denoted as a radio frequency reference 101, an MCU frequency reference 102 and a time frequency reference 103 no matter if they are used as a reference for: generating a radio signal, time measurements or for clocking a microcontroller or peripherals of the microcontroller.

The radio frequency reference 101, is the reference for the radio frequency circuit. It serves the purpose of being the frequency reference for generating radio signals and is normally only operated when the radio frequency circuit is transmitting, receiving or is otherwise active. It may be a high precision crystal oscillator (XO) or a temperature Compensated Crystal Oscillator (TCXO) or an Oven Controlled Crystal Oscillator (OCXO) or any other high precision frequency reference. The radio frequency reference is characterized by a high accuracy in that it has a low offset error and is very temperature stabile. Further, it is characterized by a relatively high nominal frequency in the range 20-200 MHz and a high energy consumption in the context of a battery-operated utility meter such as more than 500 μA.

The MCU frequency reference 102, is a reference for the microcontroller. It has the purpose of generating a clock for the microcontroller which is used as a clock source for peripheral devices of the microcontroller such as timers and communication interfaces, but it may as well be the source for the operating clock clocking the core of the microcontroller. The MCU frequency reference is normally only operated when the microcontroller, i.e. the core or one of the peripherals for which it is a clock source, is active. It may be a Digitally Controlled Oscillator, based on a RC-Oscillator or a piezo electric resonator. It may be integrated into the microcontroller or be an external device. It is typically characterized by a large offset error and an operating frequency which is highly influenced by the temperature. The operating frequency is often the clocking frequency of the microcontroller which is typically in the range of 1-20 MHz for a battery-operated meter, the energy consumption of the MCU frequency reference is relatively high.

The time frequency reference 103, is a reference for the microcontroller and/or an external Real Time Clock (RTC). It is typically used for long term timing such as RTCs. The time frequency reference is operated continuously to enable continuous time measurements. It may be a low power Crystal Oscillator XO or any other type of low power oscillator which is based on a piezo electric element. It is characterized by a low energy consumption and a medium offset error and a medium susceptibility to temperature changes. The operating frequency is typically kept low in the range from 1-200 kHz to achieve a low energy consumption of the continuously operated frequency reference. Especially a nominal frequency of 32768 Hz is a common choice for the frequency reference for an RTC.

To obtain an RTC with a high precision it is desirable to propagate the high precision properties of the radio frequency reference to the time and/or MCU frequency reference without increasing the current consumption of the utility meter significantly. This is complicated by the fact that the operating frequency of the radio frequency reference is higher than the operating frequency of the MCU and time frequency references, rendering direct measurements on the radio frequency reference relative to the MCU or time frequency reference impossible.

Now referring to FIG. 1, the microcontroller 104, is connected to the radio frequency circuit 105 through a control interface 106. The microcontroller is arranged to control the radio frequency circuit to transmit radio signals. Further the microcontroller is connected to a transducer circuit 107 to receive consumption data and transducer data to be transmitted through the radio frequency circuit 105. The transducer circuit is connected to a utility distribution network 108 and is arranged to measure consumption related parameters. The microcontroller may also be arranged to control the transducer circuit 107 and calculate consumption data based on data from the transducer circuit. The Microcontroller is connected to the MCU frequency reference 102 and the time frequency reference 103, alternatively they are integrated into the microcontroller which is common for Digital Controlled Oscillators (DCO) which are often based on a RC-oscillator. The MCU and time frequency references can be used as timing sources for timers, capture compare registers, communication interfaces and other peripherals of the microcontroller and may as such be used for time reference when the microcontroller perform time measurements.

The MCU frequency reference 102 is used for timing measurements and may in addition be the reference for generating the clocking signal for the microcontroller. Thus, the MCU frequency reference is active when the microcontroller core or a peripheral used for time measurements is active. The microcontroller is arranged to measure time parameters on a digital signal such as the timing signal 109 received on an input port. Input ports are a part of the control interface 106 connecting the microcontroller and the radio frequency circuit. The microcontroller is arranged to measure time parameters such as the time between digital state shifts e.g. a period defined between two shifts of digital state between low/digital 0 and high/digital. This is illustrated in FIG. 1 on the digital signal 109 by the time $T_{tx}$. Digital state shifts on the input port trig an interrupt in the microcontroller, which cause a capture of a timer register value in the microcontroller, either by mean of a capture register, i.e. a HW implementation, or an interrupt service routine, i.e. a SW implementation. The MCU frequency reference is timing reference for the timer register. Time periods may afterwards be calculated based on the captured timer register values.

The time frequency reference 103, is used as timing source for an RTC and is thus continuously active. The Time frequency reference is the reference for a timer register in the microcontroller used to implement an RTC functionality. The RTC functionality may partly be a SW implementation making use of the HW timer register sourced by the time frequency refence to update a number of SW timing registers allocated in a memory space such as the RAM memory space. Basic RTC implementations in microcontrollers are commonly known within the art. The RTC of this embodiment further has an offset adjustment functionality arranged to compensate for an error of the time frequency reference. The error is input to the RTC as an error estimate. The error estimate is used to correct the value of the HW timer register or the SW timer register. Correction of the registers is made with regular intervals or when the accumulated error is larger than at least one tick of the relevant timing register. The error estimate is input to the RTC either as a single offset value such as +/−X ppm or as a function of temperature such as e.g. a table of 120 offset values corresponding to temperatures from −40-+80° C. To optimize and simplify the implementation the table of offset values may instead of temperature steps of 1° C. have steps in the range of 2° C. -10° C. To make use of the temperature depending offset table, the microcontroller has access to a temperature sensor suitable for measuring the temperature of the time frequency reference or a temperature related thereto. It is common practice to use an internal temperature sensor of the microcontroller to estimate the temperature of the time frequency reference even though it is not integrated in the microcontroller. Correction of the register is then made by determining an average temperature for a correction period and selecting an offset value for the correction period corresponding to the average temperature of the correction period. Alternatively, the correction value is chosen based on a single temperature measurement and used until a new temperature measurement is performed.

The radio frequency reference 101 is connected to the radio frequency circuit 105 and is the reference for generation of radio signals by the radio frequency circuit. The generated radio signal has a centre frequency and a symbol rate, the symbol rate is also called the symbol frequency. The radio frequency reference is the reference for the centre frequency and the symbol frequency. The microcontroller 104 is arranged to control the radio frequency circuit 105 through the control interface 105 to generate a radio signal with a symbol frequency selected by the microcontroller, but derived from the radio frequency reference, and a number of symbols selected by the microcontroller. A transmission duration $T_{tx}$ can be calculated by the microcontroller from the number of symbols and the symbol rate. The transmission duration is to be calculated based on all parts of the radio signal including any coding such as Forward Error Correction (FEC) coding and if present, a pre-amble part, a synchronization part, a power ramping part, a post-amble part and any other part of the radio signal. The different parts of the radio signal are defined by a number of symbols. The radio frequency circuit is arranged to signal a timing signal on the control interface 106. The timing signal comprises timing information on the start of transmission and the end of transmission. This means that the time point of starting the transmission of the first symbol and the time point of ending the transmission of the last symbol can be derived from the timing signal. The timing signal 109 is in its simplest form a digital signal arranged to change from low (binary 0) to high (binary 1) when transmission starts and from high to low when the transmission ends. Additional events or elements may be signalled on the control interface 106 depending on the configuration of the radio frequency circuit, such as start and end of preamble, synch and other parts of the radio signal. The radio frequency reference is powered during the time period of generating and transmitting the radio signal. After the transmission has ended the radio frequency reference is powered down to minimize energy consumption. The radio frequency circuit may be an integrated circuit such as CC1200 from Texas Instruments or S2-LP from STMicroelectronics or the microcontroller and the radio frequency circuit may be integrated in SoC a (System on Chip) solution such as CC1310 from Texas Instruments.

The control interface 106 comprises one or more physical communication interfaces supported by the radio frequency circuit and microcontroller. The interfaces supported differs between different radio frequency circuits, but commonly used interfaces are SPI (Serial Peripheral Interface) and I2C (Inter-Integrated Circuit). Further the control interface 106 comprises digital signalling through digital ports such as GPIOs (General Purpose Input/Output). If the radio frequency circuit and the controller is supplied with different supply voltages, the control interface may comprise level converters.

The microcontroller is arranged to control the radio frequency circuit to generate and transmit radio signals comprising consumption and/or sensor data. The radio signals are transmitted with regular intervals or based on events triggered by one or more of: consumption data, sensor data and time. The data is embedded in a data packet which is coded according to a communication protocol, such as M-Bus (EN13757) or any other suitable communication protocol including proprietary communication protocols. The microcontroller generates the radio packet to be transmitted and calculates the number of bytes in the data packet. The microcontroller also calculates the resulting number of symbols of the radio signal to be transmitted based on the length of the radio packet, applied coding such as Forward Error Correction and additional parts of the radio signal such as a pre-amble part, a synchronization part, a power ramping portion, a post-amble and any other portion of the radio signal. From the number of symbols to be transmitted and the symbol frequency a calculated transmission duration $T_{tx\_CALCULATED}$ can be calculated. The microcontroller controls the radio frequency circuit to generate and transmit the radio signal and to signal a timing signal on the control interface 106 including information on the start of transmission and the end of transmission. The timing signal is generated by letting an GPIO change state from low to high when transmission is started and changing state from high to low when transmission ends. As the symbol frequency of the radio signal is derived from the radio frequency reference 101 it will have the precision of the radio frequency reference and the resulting timing signal will as well have the precision of the radio frequency reference.

The generated timing signal 109 is received by the microcontroller on a GPIO port. Changes in the digital state of the timing signal cause a capture and storage of the content of a timer register in the microcontroller, the timer register use the MCU frequency reference as timing reference. Thus, by capturing timer values of a timer sourced by the MCU frequency reference 102 according to the received timing signal the microcontroller measures the transmission duration of the radio signal, $T_{tx\_MEASURED}$, with reference to the MCU frequency reference. By comparing the calculated transmission duration, $T_{tx\_CALCULATED}$, and the measured transmission duration, $T_{tx\_MEASURED}$, the frequency error of the MCU frequency reference 103 relative to the radio frequency reference, $Error_{MCU\_RADIO}$, can be calculated as:

$$Error_{MCU-RADIO} = \frac{T_{tx\_CALCULATED} - T_{tx\_MEASURED}}{T_{tx\_MEASURED}}$$

The error of the MCU frequency reference relative to the radio frequency reference, $Error_{MCU\_RADIO}$, is subsequently used for correction of time measurements made with the MCU frequency reference as timing reference $Measurement_{MCU}$ as shown below:

$Measurement_{MCU\_CORRECTED} = Measurement_{MCU} \times (1 + Error_{MCU-RADIO})$ Alternatively, if the MCU frequency reference is a DCO $Error_{MCU\_RADIO}$ may be used to correct the operating frequency of the MCU frequency reference.

The $Error_{MCU\_RADIO}$ may be determined each time a radio signal is generated or only if some condition is met, such as the time since the last measurement has exceeded a limit or the temperature has changed. Further, if the time period between transmissions becomes very long an additional generation of a radio signal may be initiated to provide basis for determination of $Error_{MCU\_RADIO}$, however, the radio signal does not need to be transmitted or may be transmitted at the lowest possible output power to reduce energy consumption and minimize congestion in the radio channel or alternatively be transmitted in a communication channel not used by the AMI system.

While receiving the timing signal 109 the microcontroller may also measure the temperature of or a temperature related to the MCU frequency reference. By saving the $Error_{MCU\_RADIO}$ along with the measured temperature a Temperature-frequency- error-table for the MCU frequency reference describing the relation between the temperature and $Error_{MCU\_RADIO}$ may be created. The Temperature-frequency-error-table for the MCU frequency reference may subsequently be used to correct time measurements made with the MCU frequency reference as timing reference according to temperature at the time of measurement.

After the error of the MCU frequency reference relative to the radio frequency reference $Error_{MCU\_RADIO}$ has been calculated a time period of the time frequency reference is measured with reference to the MCU frequency reference. The time period may be measured over a single period-time or multiple period-times of the signal of the time frequency reference. Period-time is defined as 1/frequency. The time period to be measured has a nominal duration, $T_{TIME\_NOMINAL}$, which is the duration if the time frequency reference has no error, which is calculated from the nominal frequency of the time frequency reference. The measured time period, $T_{TIME\_MEASURED}$, is measured with reference to the uncorrected MCU frequency reference and afterwards corrected for the error of the MCU frequency reference relative to the radio frequency reference, $Error_{MCU\_RADIO}$. By comparing the nominal duration, $T_{TIME\_NOMINAL}$, to the measured and corrected duration the error of the time frequency reference relative to the radio frequency reference, $Error_{TIME\_RADIO}$, can be calculated as:

$$Error_{TIME-RADIO} = \frac{T_{TIME\_MEASURE} \times (1 + Error_{MCU-RADIO}) - T_{TIME\_NOMINAL}}{T_{TIME\_NOMINAL}}$$

The error of the time frequency reference relative to the radio frequency reference, $Error_{TIME\_RADIO}$, is subsequently used for correcting time measurements made with the time frequency reference as time reference. The time period of the time frequency reference is measured by the microcontroller by capturing the value of a timer register, which use the MCU frequency reference as time reference, at the start of the time period and at the end of the time period. The time period is a whole number of periods of the signal from the time frequency reference.

To minimize measurements errors the time period of the time frequency reference shall be selected to be large compared to the tick time (tick time is equal to period-time calculated as 1/operating frequency) of the reference used for measurement. The time period is selected so that the ratio of the tick time to the time period measured is in the range 0.0000005-0.000010. The best accuracy is achieved when the ratio is kept low.

The time period of the time frequency reference is measured shortly after measuring the duration of the radio signal, $T_{tx\_MEASURED}$, so that the temperature can be considered to be unchanged between the two messages. By saving the $Error_{TIME\_RADIO}$ along with the measured temperature the Temperature-frequency-error-table may be extended to cover also the time frequency reference in that it includes $Error_{TIME-RADIO}$.

The error of the time frequency reference relative to the radio frequency reference $Error_{TIME\_RADIO}$ is fed as an input to the RTC for correction of the time maintained by the RTC. Hereby the RTC operates with a precision which is closely related to the high precision temperature compensated radio frequency reference, even though the low power time frequency reference is the continuously operated time reference for the RTC. Thus, a low power high precision RTC is obtained without increasing the power consumption significantly in that the measurement of the radio frequency reference relative to the time frequency reference is only performed in periods when the radio frequency reference any way would be active due to the generation of radio signals. The precision of the RTC will not be exactly the same as the precision of the radio frequency reference, which will be elaborated below.

By the abovementioned measurements a Temperature-Frequency-Error-Table (TFET) is created. The TFET includes for each temperature interval $Error_{MCU-RADIO}$ and $Error_{TIME\_RADIO}$ and may be used to correct measurements made with reference to the MCU and radio frequency reference. When the TFET has been established covering all relevant temperatures it may not need to be updated frequently. This is especially the case after some years of operation in that the aging effects of frequency references based on the piezo electro effect typically is most prominent during the fir 1-3 years of operation. Further the error values in the TFET may be statistical values such as average values or median values based on multiple determinations of the error.

In an alternative embodiment the error of the time frequency reference is determined without using the MCU frequency reference 102 as an intermediate step. The transmission duration is measured directly with reference to the time frequency reference 103. The generated timing signal 109 is received by the microcontroller on a GPIO port. Changes in the digital state of the timing signal cause a capture and storage of the content of a timer register in the microcontroller, the timer register use the time frequency reference as timing reference. Thus, by capturing timer values of a timer sourced by the time frequency reference 102 according to the received timing signal the microcontroller measures the transmission duration of the radio signal, $T_{tx\_MEASURED}$, with reference to the time frequency reference. By comparing the calculated transmission duration, $T_{tx\_CALCULATED}$, and the measured transmission duration, $T_{tx\_MEASURED}$, the frequency error of the time frequency reference 103 relative to the radio frequency reference, $Error_{TIME\_RADIO}$, can be determined directly without the MCU frequency reference as an intermediate step as:

$$Error_{TIME-RADIO} = \frac{T_{tx\_CALCULATED} - T_{tx\_MEASURED}}{T_{tx\_MEASURED}}$$

The error of the time frequency reference relative to the radio frequency reference, $Error_{TIME\_RADIO}$, is subsequently used for correction of time measurements made with the time frequency reference as timing reference. Using the time frequency reference directly for measuring the transmission duration has the draw back that the accuracy of the measurement will be limited by the resolution of the time frequency reference. Further, if the transmission duration is short compared to the tick time the total tolerance of the measurement will cause a high loss of accuracy when determining the error. However, by leaving out the intermediate step a simple solution is achieved which may be desired and suitable for some applications.

The utility meter is battery powered. The battery 110 is integrated in the meter but may be replaceable. The energy meter may supplement the energy available from the battery by energy harvesting or receive additional energy through communication interfaces such as wired M-Bus interfaces or Near Field Communication (NFC) such as RFID. However, such sources of energy harvesting typically only deliver a very limited amount of energy, thus saving energy is still an important issue.

The utility meter may be any kind of battery-operated utility meter, utility sensor or environmental sensor being part of a utility network especially utility meters used in connection with district heating, district cooling and/or distributed water supply. Common battery-operated utility meters are water meters for cold and/or hot water, heat meters for district heating, cooling meters, gas meters, energy meters or smart meter. The utility meter may be a legal meter, i.e. a meter which is subdued to regulatory demands. Such regulatory demands may be demands to the precision of the measurements. Common utility sensors used by utilities are pressure sensors, temperature sensors, acoustic sensors, flow sensors, chemical sensors. The utility meter comprises one or more transducers and transducer circuits 107 for measuring an amount of delivered utility. The transducers may be a flow transducer, a temperature transducer, pressure transducers, acoustic transducers, turbidity transducers or transducers arranged to measure chemical substances in the utility. Especially the flow transducer may be arranged to measure a flow rate of a fluid flowing in a flow channel by use of the known operation principle for transit time flow meters, where ultrasonic signals are emitted at one transducer and received at the other transducer, and where the difference in time-of-arrival between oppositely propagating signals is measured and converted into a flow rate.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A radio communication device comprising:
a microcontroller connected to a radio frequency circuit by one or more control interfaces and arranged to control the radio frequency circuit to transmit a radio signal with a number of symbols and a symbol frequency;
a time frequency reference of lower precision arranged to be a reference to the microcontroller for time measurements, such as time reference for a real time clock; and
a radio frequency reference of higher precision connected to the radio frequency circuit and arranged to be frequency reference for generation of at least the symbol frequency of the radio signal;
wherein the microcontroller is arranged to determine and compensate for a frequency error of the lower precision time frequency reference relative to the radio frequency reference based on:
a timing signal generated by the radio frequency circuit and associated to a transmission duration of the radio signal,
the number of symbols, and
the symbol frequency controlled by the higher precision radio frequency reference.

2. A radio communication device according to claim 1, further comprising an MCU frequency reference connected to the microcontroller, and arranged to be a reference to the microcontroller for time measurements, wherein the microcontroller further is adapted to:
measure on the timing signal a transmission duration of the radio signal with reference to the MCU frequency reference;
calculate a frequency error of the MCU frequency reference relative to the radio frequency reference based on the measured transmission duration, the number of symbols and the symbol frequency;
measure a time period of the time frequency reference with reference to the MCU frequency reference; and
calculate the frequency error of the time frequency reference relative to the radio frequency reference based on the frequency error of the MCU frequency reference and the measured time period of the time frequency reference.

3. A radio communication device according to claim 2 wherein the microcontroller further is adapted to, via the one or more control interfaces, control the radio frequency circuit to:
transmit the radio signal,
generate the timing signal on at least one of the one or more control interfaces, the timing signal comprising information on start of transmission and end of transmission of the radio signal; and
receive the timing signal from the radio frequency circuit and measure the transmission duration of the radio signal with reference to the MCU frequency reference.

4. A radio communication device according to claim 3, wherein one of the one or more control interfaces comprises an input/output port on the microcontroller and the radio frequency circuit, respectively.

5. A radio communication device according to claim 3, wherein one of the one or more control interfaces is arranged according to a serial communication protocol such as I2C or SPI.

6. A radio communication device according to claim 2, wherein the radio frequency reference has an operating frequency which is higher than the operating frequency of the MCU frequency reference and the time frequency reference has an operating frequency which is lower than the operating frequency of the MCU frequency reference.

7. A radio communication device according to claim 2, wherein the nominal absolute precision of the radio frequency reference is higher than the nominal absolute precision of the MCU frequency reference and the time frequency reference.

8. A radio communication device according to claim 2, wherein the radio frequency reference has a nominal frequency in a first range of 20-200 MHz, the MCU frequency reference has a nominal frequency in a second range of 2-20 MHz and the time frequency reference has a nominal frequency in a third range of 2-200 kHz.

9. A radio communication device according to claim 2, wherein the MCU frequency reference is the reference for a microcontroller clock.

10. A radio communication device according to claim 2, wherein the MCU frequency reference is a digitally controlled oscillator integrated in the microcontroller.

11. A radio communication device according to claim 10, wherein the microcontroller further is arranged to perform a step of adjusting the digitally controlled oscillator to compensate for the frequency error of the MCU frequency reference, whereby calculation of the frequency error of the time frequency reference relative to the radio frequency reference is based on the frequency error of the MCU frequency reference.

12. A radio communication device according to claim 1, comprising a Real Time Clock wherein the time frequency reference is the reference for the Real Time Clock.

13. A radio communication device according to claim 1, further comprising a temperature sensor arranged to measure an internal temperature of the radio communication device and wherein the microcontroller further is arranged to measure the internal temperature when determining the frequency error of the time frequency reference to create a temperature-frequency-error table describing the frequency error as a function of the internal temperature.

14. A radio communication device according to claim 13, wherein the microcontroller is arranged to measure an internal temperature of the radio communication device and to correct a Real Time Clock of the radio communication device according to the internal temperature and the temperature-frequency-error table.

15. A utility meter for measuring an amount of a utility delivered to a consumption site, the utility meter comprising:
 a radio communication device according to claim 1; and
 a time measurement device, such as a real time clock, wherein the time frequency reference is the reference to the time measurement device.

* * * * *